Figure 1:
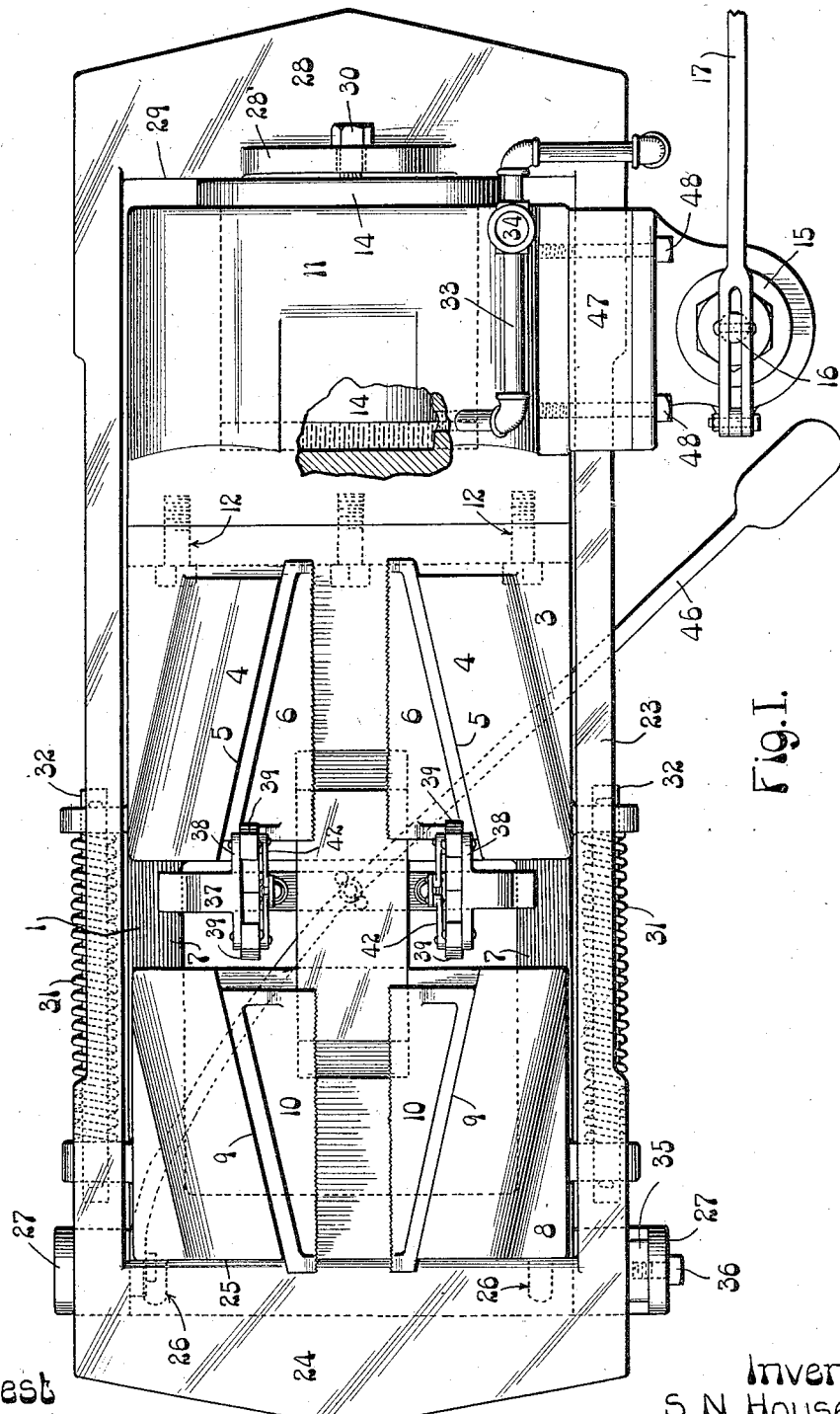

S. N. HOUSE.
TIRE SHRINKING MACHINE.
APPLICATION FILED JAN. 23, 1912.

1,060,339.

Patented Apr. 29, 1913.
3 SHEETS—SHEET 1.

Attest
A. J. McCauley
E. B. Linn

Inventor:
S. N. House
by Knight & Cook
Attys.

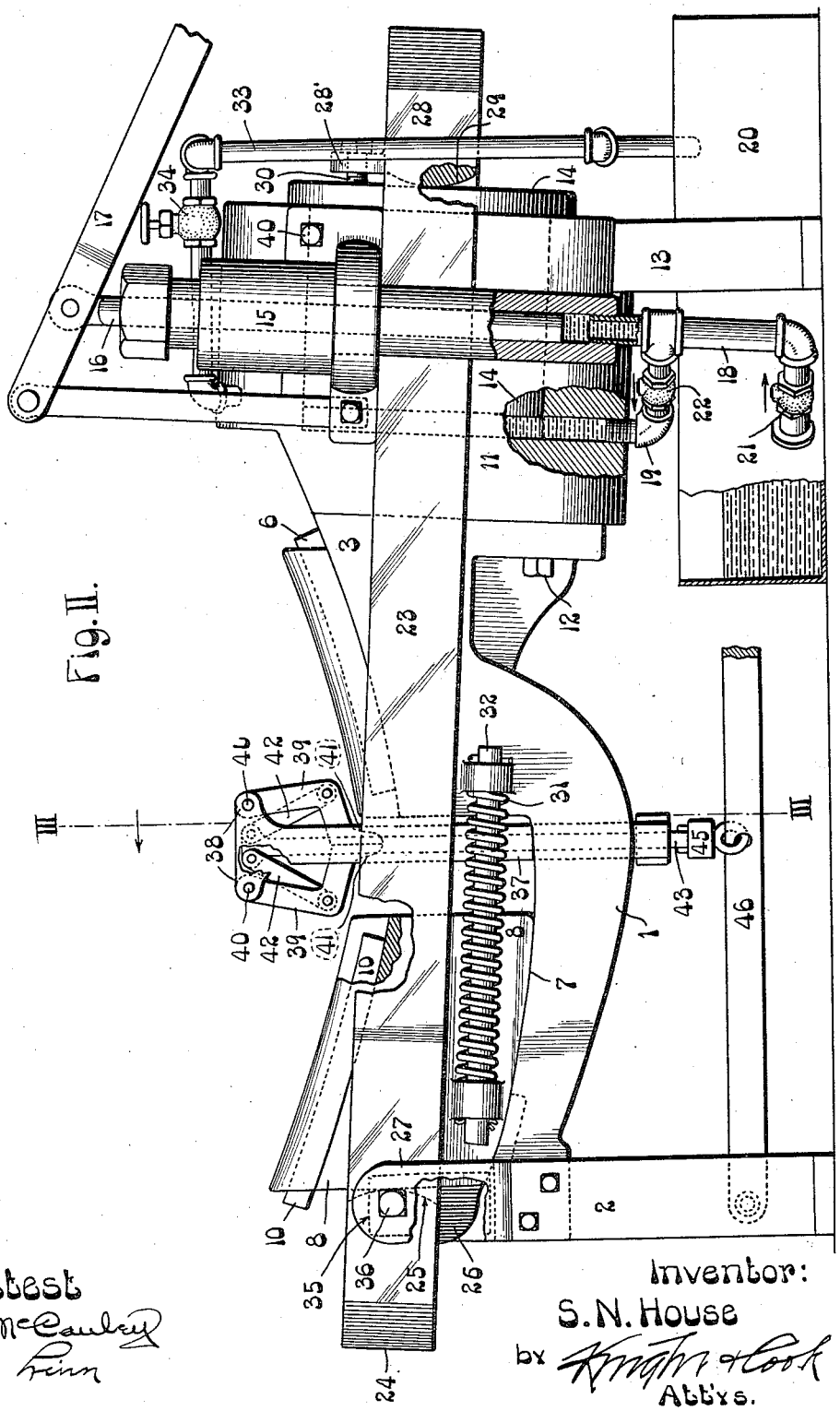

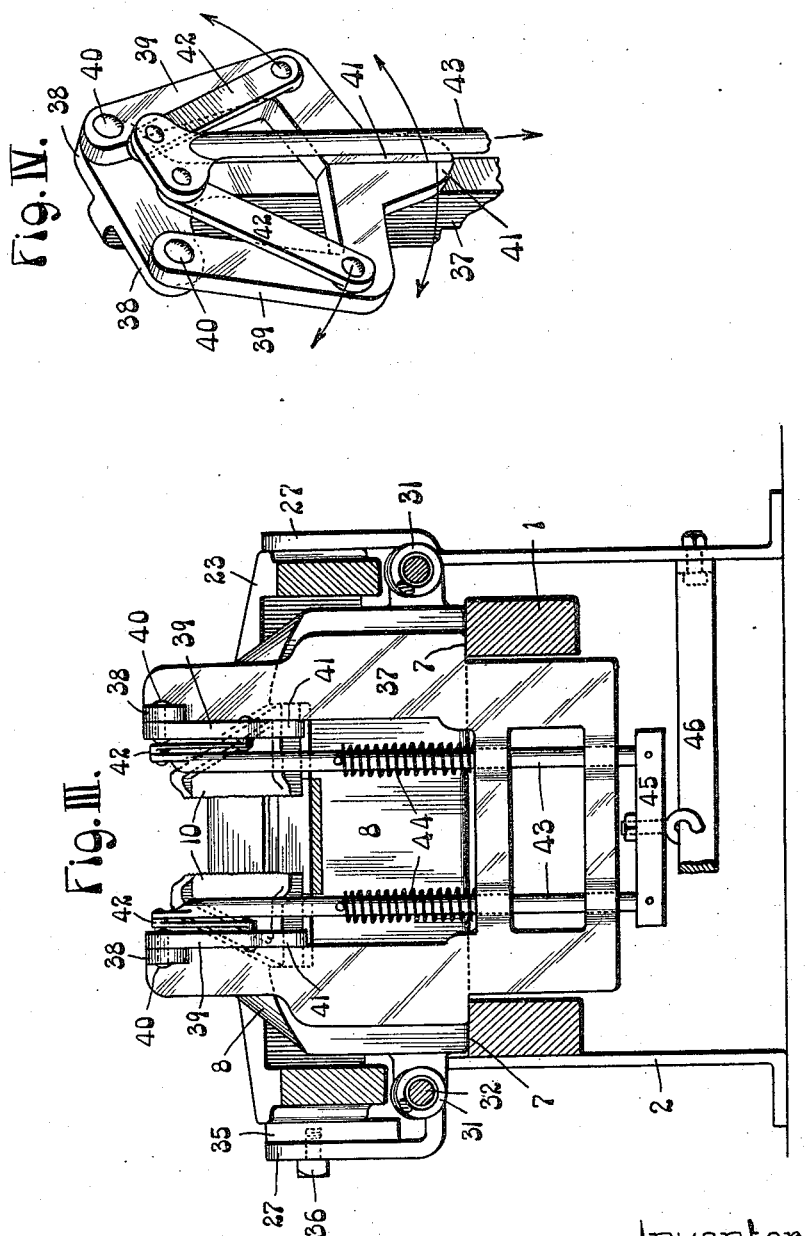

UNITED STATES PATENT OFFICE.

SAMUEL N. HOUSE, OF ST. LOUIS, MISSOURI.

TIRE-SHRINKING MACHINE.

1,060,339.  Specification of Letters Patent.  Patented Apr. 29, 1913.

Application filed January 23, 1912. Serial No. 672,830.

*To all whom it may concern:*

Be it known that I, SAMUEL N. HOUSE, a citizen of the United States of America, residing at the city of St. Louis, State of Missouri, have invented certain new and useful Improvements in Tire-Shrinking Machines, of which the following is a full, clear, and exact description, reference being had to the accompanying drawings, forming a part of this specification.

My invention relates to a machine for shrinking vehicle wheel tires, the present machine being one intended, more particularly to be operated by hydraulic power.

One of the objects of the present invention is the provision in a tire setter of a member for operating the movable wedge block carrier which is capable of moving in a curved path corresponding to a similar path of movement of the carrier and the curvature of the tire being set.

Another object of my invention is to provide mechanical means by which the tire gripping wedge blocks may be shifted into tire gripping positions.

Another object of my invention is to provide take-up means between the yoke and yoke guides of the machine whereby the yoke may be adjusted laterally for the purpose of properly positioning it relative to the parts that coöperate therewith.

A further object of my invention is to provide removable means by which a hydraulic pump is connected to the body of the machine in such manner as to permit the removal of the yoke without the necessity of dismounting the pump.

Figure I is a top or plan view of my tire-shrinking machine, with a portion of the ram cylinder broken out to afford a view of the interior of such cylinder. Fig. II is a side elevation of the machine with portions in section. Fig. III is a vertical cross section taken on line III—III, Fig. II. Fig. IV is an enlarged perspective view of one of the wedge block shifting mechanisms.

In the drawings: 1 designates the main frame of my machine, supported at one end by suitable means, such as legs 2. At the rear end of the frame 1 is a head 3, provided with bearing members 4, having inclined faces 5 diverging from each other toward the front end of the frame 1 and serving as bearing faces for tire gripping blocks 6, between which the tire to be shrunk may be clamped. The frame 1 is provided with rearwardly extending curved runways 7, as seen in Fig. II.

8 designates a movable wedge block carrier operable longitudinally of the machine upon the runways 7, the said carrier being provided with bearing members having inclined faces 9 diverging from each other toward the head 3.

10 are tire gripping wedge blocks seated between the inclined faces 9.

11 designates a ram cylinder against which the head 3 of the frame 1 abuts, as seen in Figs. I and II, the said frame and cylinder being secured to each other by suitable means, such as connecting screws 12. The ram cylinder 11 is supported by suitable means, such as legs 13, and in said cylinder is a ram 14 that is adapted to be moved rearwardly in the cylinder upon the introduction of hydraulic pressure medium into the cylinder in front of said ram. The means I have shown for the introduction of such hydraulic pressure medium is a pump comprising a barrel 15, a piston rod 16 operable in said barrel, a piston rod operating lever 17, and conducting pipes 18 and 19, the former of which leads to said pump barrel and the latter of which leads from the former into the ram cylinder 11. The conducting pipe 18 receives a supply of liquid from a tank 20, and contains a check valve 21 serving to prevent return flow of liquid from said pipe after it is drawn thereinto and during delivery of liquid from the pump barrel and the pipe 18 to the ram cylinder through the conducting pipe 19. In the last mentioned pipe is a check valve 22 that prevents return flow of liquid through said pipe.

23 designates a yoke surrounding the carrier 8 and ram 14 and having its sides arranged along the ram cylinder 11 and the frame 1. At the forward end of this yoke is a cross head 24 having a vertically curved inner bearing face 25 in contact with the outer end of the movable wedge block carrier 8. The yoke 23 is loosely supported for vertical movement at the forward end of the machine by resting upon ledges 26 projecting from the wedge block carrier 8, on which the cross head 24 seats, and said yoke is confined between vertical guide members 27 extending upwardly from the frame 1. At the rear end of the yoke 23 is a cross head 28 having at its inner edge a vertically curved bearing face 29 that contacts with the ram 14 and affords a pivotal bearing for the yoke during the rise and fall movement of the forward end of said yoke, consequent to its support by the wedge block carrier 8 and the longitudinal movement of said wedge block carrier upon the inclined runways 7.

It will be readily understood that during the rearward movement of the yoke 23, when acted upon by the ram 14, the forward end of said yoke acts to impart rearward movement to the wedge block carrier 8, whereby said carrier is moved rearwardly. The said carrier, by reason of its travel upon the inclined runways 7, moves in a course corresponding to the curvature of a tire that is gripped between the wedge blocks of the machine. As said carrier partakes of the rearward movement, it moves downwardly, and it will be apparent that, the forward cross head of the yoke being supported by said carrier, the front end of the yoke will descend to the same degree as the carrier, and in so doing a uniform point of bearing between the yoke cross head and the carrier will be maintained. The thrust imparted to the carrier by the yoke will, therefore, be the same throughout the entire movement of said carrier, thus eliminating all possibility of the carrier being tilted on the runways, which would be likely to occur if the forward end of the yoke was not permitted to follow the movement of the carrier, as herein contemplated.

As will be seen, on referring to Fig. II of the drawings, the yoke 23 has its forward or carrier engaging end located above its rear or power receiving end. As a consequence, the yoke is subjected to a downward pull when it is operated and acts to hold the movable wedge block carrier to the curved runway instead of lifting the carrier from said runway. The carrier being held, in the manner explained, to its curved runway follows the curvature of the tire and the tire is readily set without injury thereto such as is likely to occur in the use of horizontal runways and wedge block carriers movable in horizontal planes thereon.

The curved bearing face 29 at the inner edge of the rear cross head 28 furnishes, in connection with the ram 14, an extremely satisfactory pivot bearing for the yoke in its vertical movement, and the rounded face 25 at the inner edge of the forward cross head minimizes the point of bearing between the yoke and the movable wedge block carrier 8, for the insurance of uniformity of thrust action imposed on said carrier by the yoke.

The rear end of the yoke 23 is supported by a hanger screw 30 seated in the ram cylinder 11 and extending loosely through an ear 28' projecting upwardly from the rear cross head of the yoke. This hanger screw provides a simple support for the yoke of such nature as to permit the necessary oscillation of the rear end of the yoke during the rise and fall movements of the forward end of the yoke.

31 designates retracting springs arranged upon supporting rods 32 and interposed between ears projecting from the frame 1 and the wedge block carrier 8. These retracting springs serve to return said carrier in a forward direction after it has been moved rearwardly through the medium of the yoke 23 and ram 14, and inasmuch as the forward cross head of said yoke is constantly in engagement with said carrier, the yoke is returned with the carrier. To permit the movement of the ram 14 in a forward direction through the influence of the carrier 8 and the yoke 23, the hydraulic pressure medium is allowed to escape from the ram cylinder 11 through a discharge pipe 33 upon the opening of a valve 34 in said pipe.

In the manufacture of a machine of the type herein described, it is difficult, without considerable expense, to finish the abutting faces of the ram cylinder and the frame attached to said cylinder in such manner as to provide for the accurate alinement of the parts. It is, therefore, obvious that unless some provision be made for the proper positioning of the yoke 23 transversely of the machine, it will not be so fitted to the parts against which its cross heads bear so as to cause it to be guided without binding action and to exert a uniform thrust against the movable wedge block carrier 8. To compensate for the defect in alinement, I introduce between either of the vertical guides 27, according to necessity, a take up block 35 that is held by a screw 36 seated in said guide. This take up block, which may be of the necessary thickness for the desired compensation, serves as a bearing for the yoke at the location of the guide member with which it is associated and gives the necessary degree of accuracy in the positioning of the yoke.

I now come to the description of the means employed in my machine for shifting the tire gripping wedges into positive engagement with the tire to be gripped thereby.

37 designates a U-shaped frame mounted upon the frame 1 and occupying a position between the head 3 of said frame and the movable wedge block carrier 8. At the upper ends of the uprights of the frame 37 are ears 38.

39 are push arms pivoted at 40 to the ears 38, from which they are suspended. The push arms just referred to are arranged in pairs, as seen most clearly in Figs. II and IV, and they are provided at their lower ends with fingers 41 adapted to engage the tire gripping wedge blocks 6 and 10 upon the spreading of the push arms from the positions in which they are seen in the views mentioned. Each pair of push arms is arranged at a side of the machine so that the block engaging fingers are interposed between the gripping wedges at such side of the machine, thus providing for the movement of the wedges 6 in one direction, and the movement of the wedges 10 in the opposite direction upon the impartation of movement to the push arms in a direction longitudinally of the machine.

42 are toggle links, each pivoted at one end to the push arm that is to be operated thereby, and each having its other end pivotally connected to a pull rod 43. The pull rods 43 are vertically arranged in the frame 37 and are normally held in elevated positions by lift springs 44 which, by holding the pull rods elevated, cause them to hold the pairs of push arms in their normal or unspread positions. The pull rods 43 are connected to a cross bar 45 located beneath the frame 37, and said cross bar has connected to it a foot lever 46 by which the pull rods may be drawn downwardly for the purpose of spreading the push arms 39, in order that they will perform their service of shifting the tire gripping wedge blocks into engagement with the tire that is to be gripped thereby.

It is highly desirable in producing a tire shrinking machine operated by hydraulic power to combine the pump with the machine so that it is intact with the other structural features of such machine, and it will be apparent that when the connection between the pump and the other parts of the machine is located above a part, such as the yoke 23, it would be necessary to dismount the pump if the connection between it and the main part of the machine was a fixed connection. The removal of the yoke of my machine is necessary when repairs of parts beneath said yoke are required, in order that such parts as need repair may be taken from the machine. To permit the removal of the yoke without disturbing the pump, I place between the ram cylinder 11 and the pump a removable distance block 47 that overlies the side of the yoke between said cylinder and pump. This distance block fills a gap between the cylinder and pump of sufficient width to permit the passage of the side of the yoke therethrough, and the pump is secured to the ram cylinder by connecting screws 48 that pass through said block. It will be evident that all that is required to be done to permit the removal of the yoke is the extraction of the connecting screws 48, the removal of the distance blocks 47, and the displacement of the discharge pipe 33, all of which may be readily and quickly accomplished without disturbing the pump, or the connections between said pump and the ram cylinder of the machine.

I claim:—

1. In a tire shrinking machine, a pair of tire gripping members, a curved runway leading toward said gripping members, a gripping member carrier movable in a curved path on said runway, a second pair of gripping members carried by said carrier, a carrier operating member movable in a curved path with said carrier, said carrier operating member having a curved face which abuts against the end of said carrier to transmit the movement of said carrier operating member to said carrier, and means for actuating said carrier operating member.

2. In a tire shrinking machine, a pair of tire gripping members, a curved runway leading toward said gripping members, a gripping member carrier movable on said runway, a second pair of gripping members carried by said carrier, a carrier operating yoke one end of which is movable in a curved path with said carrier in its movement on said runway, and a ram operated by hydraulic pressure for imparting movement to said yoke to move said carrier on said runway; said yoke including a cross head at one end abutting against said carrier and a cross head at its other end in pivotal engagement with said ram.

3. In a tire shrinking machine, a pair of tire gripping members, a curved runway leading toward said gripping members, a gripping member carrier movable on said runway, a second pair of gripping members carried by said carrier, a carrier operating yoke one end of which is movable in a curved path with said carrier in its movement on said runway, and a ram operated by hydraulic pressure for imparting movement to said yoke, to move said carrier on said runway; said yoke including a cross head having a curved bearing face engaging said ram and also having a curved bearing face engaging said carrier.

4. In a tire shrinking machine, a pair of tire gripping members, a curved runway leading toward said gripping members, a gripping member carrier movable on said runway, the said carrier being provided with ledges, a second pair of gripping members carried by said carrier, a yoke resting on the ledges of said carrier and movable in a curved path therewith as the carrier travels on said runway, and means for operating said yoke to move said carrier toward said first named gripping members.

5. In a tire shrinking machine, a frame provided with a tire gripping device, a ram cylinder to which said frame is fitted, a ram operable in said cylinder, a gripping member carrier movable on said frame toward and away from said tire gripping device, a yoke operable by said ram for operating said gripping member carrier, guides for directing movement of said yoke, and a take-up block arranged between said yoke and one of said guides for holding said yoke in alinement with said frame and ram cylinder.

6. In a tire shrinking machine, a pair of gripping wedge holders provided with inclined faces, one of said holders being movable toward and away from the other holder, a set of gripping wedges in each of said holders, pusher members arranged between said sets of gripping wedges, a support for said pusher members, and means for operating said pusher members to shift said wedges into tire gripping positions.

7. In a tire shrinking machine, a pair of gripping wedge holders provided with inclined faces, one of said holders being movable toward and away from the other holder, a set of gripping wedges in each of said holders, pusher arms arranged between the facing ends of said gripping wedges, means for pivotally supporting said pusher arms, and means whereby said pusher arms may be operated to shift said gripping wedges into tire gripping positions.

8. In a tire shrinking machine, a pair of gripping wedge holders provided with inclined faces, one of said holders being movable toward and away from the other holder, a set of gripping wedges in each of said holders, pusher arms arranged between the facing ends of said gripping wedges, means for pivotally supporting said pusher arms, and means whereby said pusher arms may be operated to shift said gripping wedges into tire gripping positions; said last named means comprising toggle links connected to said pusher arms, and a pull rod for operating said toggle links.

9. In a tire shrinking machine, a frame provided with a tire gripping device, a gripping member carrier operable toward and away from said tire gripping device, gripping members carried by said carrier, a ram cylinder at one end of said frame, a ram operable in said cylinder, a yoke operable by said ram whereby said gripping member carrier is operated, a pump connected to said ram cylinder, the connection between said pump and cylinder including a removable distance block interposed between the cylinder and pump above said yoke.

SAMUEL N. HOUSE.

In the presence of—
E. B. LINN,
A. J. McCAULEY.

---

Copies of this patent may be obtained for five cents each, by addressing the "Commissioner of Patents, Washington, D. C."